US012322246B2

(12) United States Patent
Turner (10) Patent No.: US 12,322,246 B2
(45) Date of Patent: Jun. 3, 2025

(54) AUTOMATED CONVERSATIONAL MULTI-PLAYER GAMING PLATFORM

(71) Applicant: 52 Productions Inc., Oakland, CA (US)

(72) Inventor: Richard Turner, Universal City, TX (US)

(73) Assignee: 52 Productions Inc., Oakland, CA (US)

( * ) Notice: Subject to any disclaimer, the term of this patent is extended or adjusted under 35 U.S.C. 154(b) by 388 days.

(21) Appl. No.: 17/993,284

(22) Filed: Nov. 23, 2022

(65) Prior Publication Data

US 2023/0162563 A1    May 25, 2023

Related U.S. Application Data

(60) Provisional application No. 63/282,857, filed on Nov. 24, 2021.

(51) Int. Cl.
| | | |
|---|---|---|
| *G07F 17/32* | (2006.01) | |
| *G06F 7/58* | (2006.01) | |
| *G06F 40/40* | (2020.01) | |
| *G10L 15/26* | (2006.01) | |

(52) U.S. Cl.
CPC .......... *G07F 17/3239* (2013.01); *G06F 7/588* (2013.01); *G06F 40/40* (2020.01); *G07F 17/3293* (2013.01); *G10L 15/26* (2013.01)

(58) Field of Classification Search
None
See application file for complete search history.

(56) References Cited

U.S. PATENT DOCUMENTS

| | | | |
|---|---|---|---|
| 2010/0121808 A1* | 5/2010 | Kuhn | G06N 20/00 463/43 |
| 2016/0284157 A1* | 9/2016 | Marrinson | G07F 17/3225 |
| 2022/0309936 A1* | 9/2022 | Jang | G10L 25/63 |

* cited by examiner

*Primary Examiner* — Jason T Yen
(74) *Attorney, Agent, or Firm* — Dergosits & Noah LLP; Todd A. Noah (57) ABSTRACT

An automated conversational multi-player gaming platform is described. A machine-learning model is trained to use a natural language processor and a speech synthesizer as an automated dealer communicating with players of a game of chance. The trained machine-learning model receives requests from people to become players of a game of chance, outputs private game content associated with the game of chance to the players' private user interfaces, and outputs public game content associated with the game of chance to the players' public user interface. The trained machine-learning model receives selections of game playing options and wager values associated with the game of chance from the players via their private user interfaces, and outputs information identifying one player as a winner of the game of chance and a credit of the winner's wager value to the players' public user interface and/or the winner's private user interface.

17 Claims, 5 Drawing Sheets

CASINO SHOWDOWN DIGITAL MARQUEE

*At the entrance to the Showdown Gaming Room will be a digital marquee that will have a list of some of the games with descriptions, with video clips of play.*

Poker room Brushman says, "Welcome to our Showdown Room. On our digital monitor is a description with video play of our favorite original classics. Just go up to the marquee and say, 'Hey, Shark,' and state your language of choice."

(Casino guest) "Hey, Shark, we speak English."

"Hi, I'm The Shark. A big welcome! Any one of our conversational interactive games will provide you gaming pleasure for hours at a time or you can mix it up. For example, Shark Showdown is our original launch. It is easy to learn, and it is a real pleaser."

(Casino Guest) "Can you give us a description?"

"Of course. Shark Showdown is a 'Freeze Out' and the objective is to bust out all opponents while acquiring a winning three-card poker hand. Here's a video clip."

(Casino Guest) "Can you give us more of a description of Shark Showdown play?"

"Always, my pleasure. Picture 21, Monopoly, and Stud Poker having a baby and you'll have the gaming elements of Shark Showdown. Briefly, the players place bets against the Pot and play '11' a simpler version of the classic card game 21. The cards obtained also dictate the number of spaces the player can move around the 13-space Shark Showdown board. As players move around the board, they may purchase the winning cards associated with the spaces on which they land. The player must pay rent when landing on spaces belonging to other players. A player can play Two-Card Stud poker to beat a player out of their property and cash."

"Watch this short clip."

(Casino Guest) "What's a winning hand?"

"Using the Wild Jack there are 12 winning hands. You can win with any three-card straight flush; win with any three-of-a-kind; win with any random five property playing cards. But you will not need to know how to play. The Shark will escort the casual player that may need personalized assistance through any of our vast selections of gaming pleasures. Play until you and your other players are ready to ride the shark on your own."

(Casino Guest) "Can you show us a list of your top dozen favorites?"

"I'd be happy to. 1) Shark Showdown, 2) Texas Showdown, 3) Shark Showdown Trivia, 4) Batty Fruit, Batty Pizza, Batty Sharks, Batty T-Rex, Batty Race Cars, Batty Planets, Batty Geometric Shapes. 5) Two-Card Stud, and 6) Game of 11."

AUTOMATED CONVERSATIONAL MULTI-PLAYER GAMING PLATFORM

CLAIM OF PRIORITY

This application claims the benefit of U.S. Provisional Patent Application No. 63/282,857, filed Nov. 24, 2021, the entire contents of which are incorporated herein by reference.

BACKGROUND

The revenues for commercial casinos and tribal casinos in the United States in 2017 totaled more than $70 billion. Much of this revenue came from single player slot machines. However, casino games with a dealer and multiple players around a table were still an enormously popular form of gambling entertainment. Automated slot-machine style games cannot offer the enjoyment which is provided by the social component in multi-player dealer-based gambling games.

BRIEF DESCRIPTION OF THE DRAWINGS

FIG. 4 illustrates an example of conversational interactions between a player and an automated conversational multi-player gaming platform, under an embodiment.

DETAILED DESCRIPTION

The problem with traditional multi-player dealer-based gambling games is that scaling out this model requires trained dealers operating around the clock to run the gambling table. While feasible at larger casinos in places like Las Vegas, providing enough trained dealers is problematic for smaller casinos, cruise ships, airports, or other places where gambling is allowed but 24-hour staffing is not possible. To maximize scale while still enabling real-world social interactions, gambling casinos will replace live dealers with an automated conversational multi-player gaming platform that uses artificial intelligence to automate the role of a dealer for classic gaming products as well as gaming products originally created for this platform, while interacting with the players, and instructing the players about game rules.

Embodiments herein provide an automated conversational multi-player gaming platform. A machine-learning model is trained to use a natural language processor and a speech synthesizer as an automated dealer communicating with players of a game of chance. The trained machine-learning model receives requests from people to become players of a game of chance, outputs private game content associated with the game of chance to the players' private user interfaces, and outputs public game content associated with the game of chance to the players' public user interface. The trained machine-learning model receives selections of game playing options and wager values associated with the game of chance from the players via their private user interfaces, and outputs information identifying a player as a winner of the game of chance and a credit of the winner's wager value to the players' public user interface and/or the winner's private user interface.

For example, a training system trains a machine-learning model to use English and Spanish natural language processors and English and Spanish speech synthesizers as an automated dealer for Poker and Blackjack players at a casino near the border between the United States and Mexico. The automated dealer receives requests from Adam, Charles, J. P., and Asa to play Blackjack, deals their face-down cards, which are visible to each player on each of their private control panels' display screens, and deals their face-up cards, which are visible to all players on the shared display screen in a Blackjack table. Two players use their control panels' buttons to request another card by calling to be hit, the automated dealer jokes about the two players who did not request to be hit must have great hands of cards, and three players use their control buttons to place bets above the minimum amount. The automated dealer shows the face-down cards next to the face-up cards in the shared display screen in the Blackjack table, and congratulates Adam as the only winner because his 21 points was the only point total that was more than the house's 20 points, and gave Adam $250 because he bet $250. Meanwhile, Asa's 20 points matched the house's total, so the automated dealer gave back the $100 that Asa bet, and kept the $500 that Charles bet and the $5 that J. P. bet, complementing J. P. on quickly learning when not to bet too much.

Figure 1:
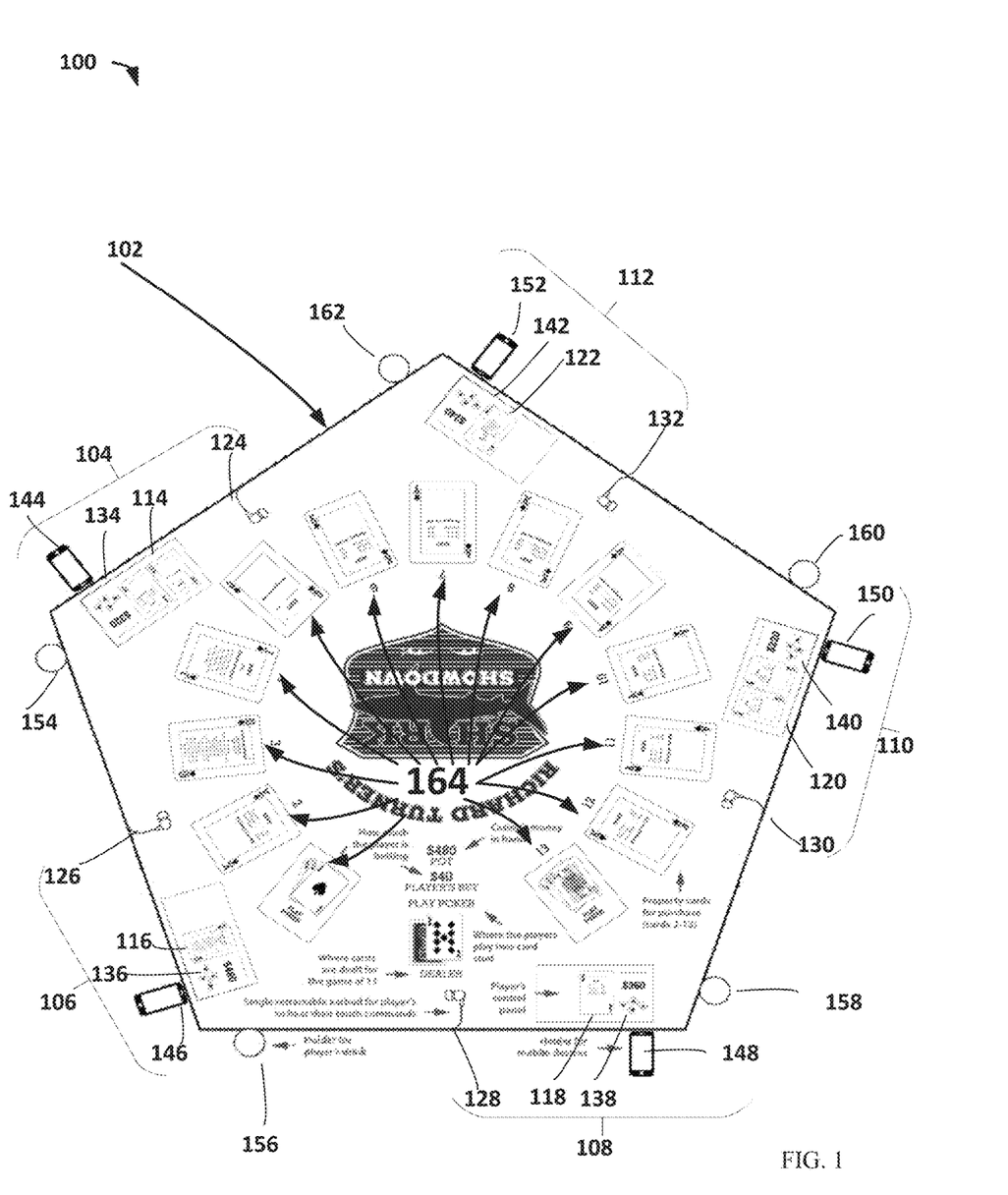
FIG. 1 illustrates an example of an instantiation of an automated conversational multi-player gaming platform, under an embodiment.

As depicted by FIG. 1, an automated conversational multi-player gaming platform 100 provides a physical gaming table 102 that enables players to gather and play games while having conversations with each other and an automated dealer. The automated dealer is equipped with speech recognition and synthesis, natural language processing, dialog management, and game logic to play the role of the dealer, to instruct players, to manage the games and bets, and to otherwise encourage interaction among the players. The table 102 can be equipped to play a large number of casino games, such as various forms of poker, blackjack, baccarat, rummy, roulette, or craps, and newer games such as Shark Showdown, Texas Showdown, and Batty.

The table 102 includes individual control panel stations 104-112 for the players, with each of the stations 104-112 including one of the built-in touch screens 114-122 with integrated privacy filters so that other players cannot see the touchscreen's private content, which may be used to privately present a player's face-down cards and their available funds for betting. Each of the stations 104-112 also includes one of the wired earbud/headsets 124-132 so that visually-impaired users can receive audio notifications from the automated dealer without other players hearing the instructions, and its own directional microphone (which is not depicted by FIG. 1) that localizes speech commands from the players. Each of the built-in touch screens 114-122 has one of the sets of integrated option buttons 134-142, where a player can enter feedback or commands, such as "hit," "stay," "raise," and "call," as appropriate for the selected game. Each of the stations 104-112 is further equipped with a holder for one of the players' mobile devices 144-152, which may be a mobile phone that communicates through Bluetooth connectivity to connect a player's personal account to the automated conversational multi-player gaming platform table 102, and of course one of the cupholder 154-162, to hold drinks during gameplay. The table 102 also has a publicly viewable screen 164 for all the players, where information is displayed that all the players can see, such as face-up cards and the amount of chips bet and/or won.

Figure 2:
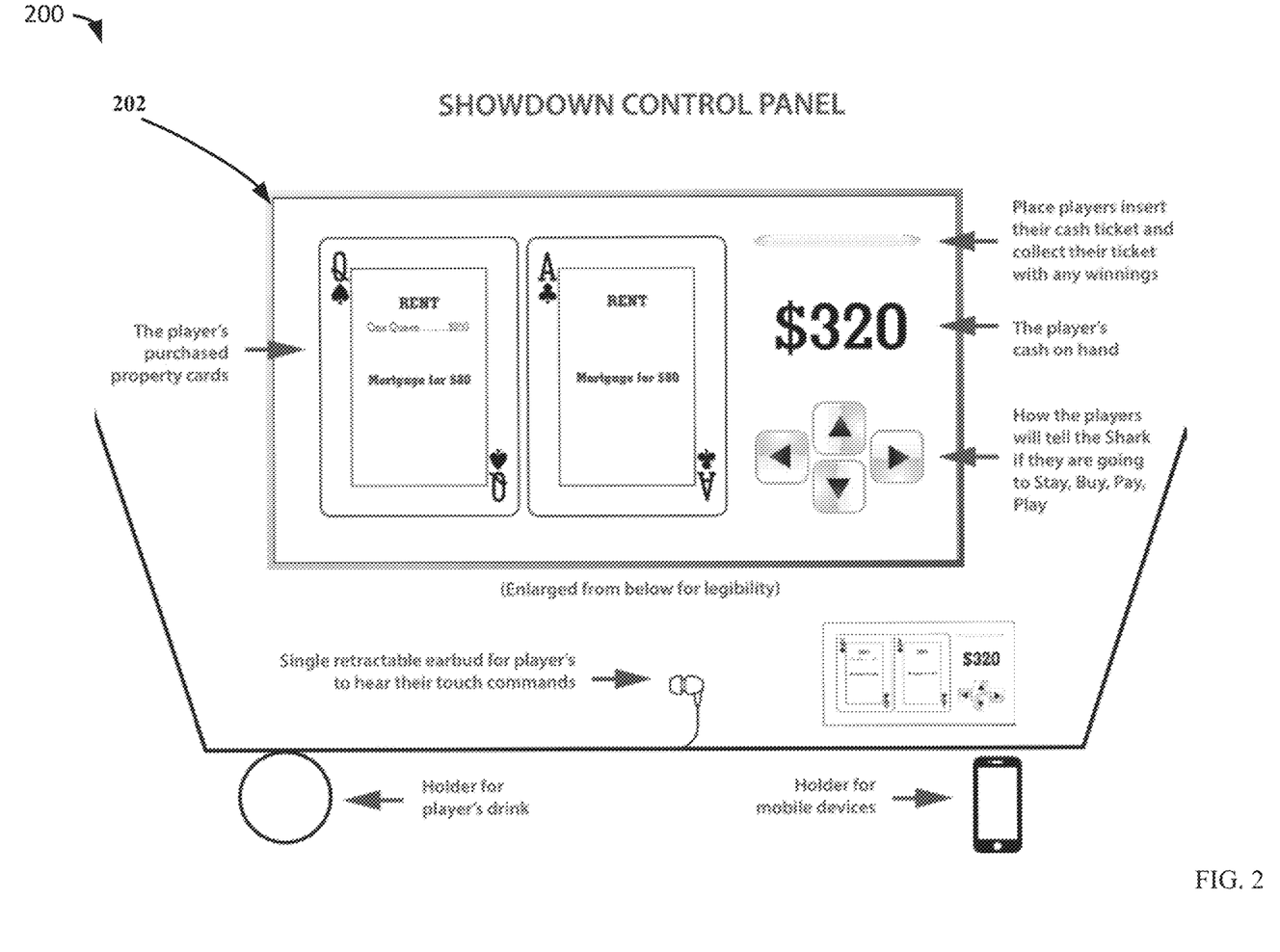
FIG. 2 illustrates an example of an individual control-panel station for a player playing a game on an automated conversational multi-player gaming platform, under an embodiment.

FIG. 2 illustrates an example of an individual control-panel station 200 for a player using an automated conversational multi-player gaming platform, under an embodiment. The individual station 200 is an enlargement of one of the individual stations 104-112 depicted by FIG. 1, and includes a frame 202 of a graphical user interface which displays private gaming content to only one player.

FIG. 2 illustrates a frame 202 of an example user interface screen of a device for a computerized game of chance, in an embodiment. The frame 202 may be part of a larger display screen that includes fields for a user to enter commands to create, retrieve, edit, and store information. Because the frame 202 is a sample, the frame 202 could vary greatly in appearance.

For example, the relative sizes and positioning of the graphical images are not important to the practice of the present disclosure. The frame 202 may be depicted by any visual display, but is preferably depicted by a computer screens. The frame 202 could also be output as a report and printed or saved in an electronic format, such as PDF.

The frame 202 may be part of a personal computer system and/or a network, and operated from system data received by the network, and/or on the Internet. The frame 202 may be navigable by a user. Typically, a user can employ a touch screen input, voice command, or a mouse input device to point-and-click to locations on the frame 202 to manage the graphical images on the frame 202.

Alternately, a user can employ directional indicators, or other input devices such as a keyboard. The graphical images depicted by the frame 202 are an example, as the frame 202 may include much greater amounts of graphical images. The frame 202 may also include fields in which a user can input information.

Figure 3:
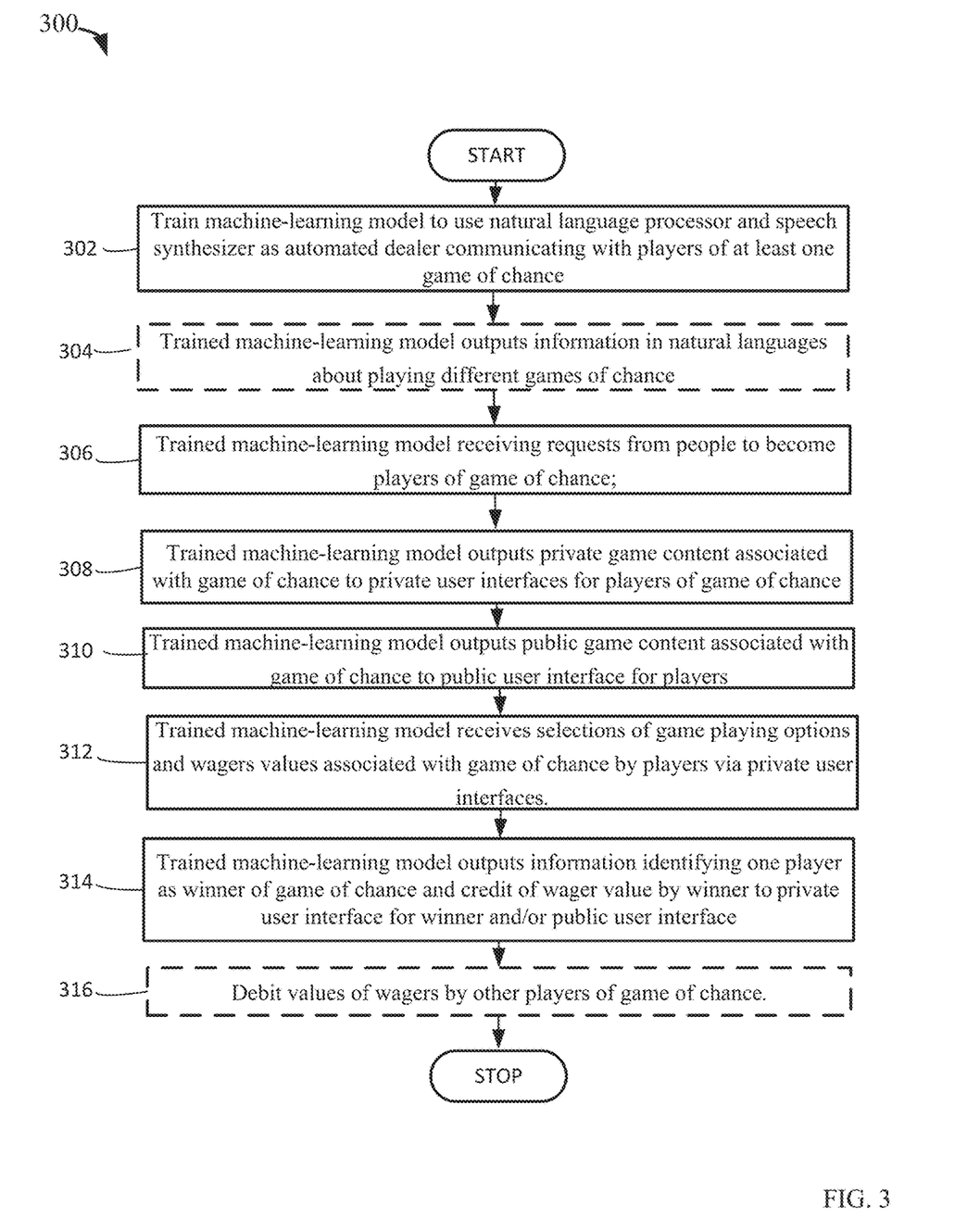
FIG. 3 is a flowchart that illustrates a computer-implemented method for an automated conversational multi-player gaming platform, under an embodiment.

FIG. 3 is a flowchart that illustrates a computer-implemented method for an automated conversational multi-player gaming platform, under an embodiment. Flowchart 300 illustrates method acts illustrated as flowchart blocks for certain actions involved in and/or between the platform's elements.

A machine-learning model is trained to use a natural language processor and a speech synthesizer as an automated dealer communicating with players of at least one game of chance, block 302. The platform is trained to provide an automated dealer for games of chance. For example, and without limitation, this may include a machine-learning model being trained by a training system to use English and Spanish natural language processors and English and Spanish speech synthesizers as an automated dealer for Poker and Blackjack players at a small casino near the border between the United States and Mexico.

The training system begins after receiving recordings of communications between dealers and players of games of chance, and reserves some of these recordings for testing a trained automated dealer. The machine-learning model applies an artificial intelligence process to the recordings of communications between dealers and players of games of chance, including the training system applying a natural language processor to the recordings of each dealer and each player to convert the recordings into a machine-usable form, and then the machine-learning model uses the converted recordings to learn how to participate in subsequent communications as an automated dealer. The automated dealer is trained to use a speech synthesizer to prompt a player of a game of chance to provide game information, and then use a natural language processor to understand a phrase that is spoken or otherwise input by the player.

For example, the automated dealer is trained to participate in and record the game communications that follow an automated prompt for a player's game information, with the automated dealer being trained to create the automated prompt via speech synthesis and/or to provide the prompt as text. Although this example describes communications between an automated dealer and a player via speaking, the communications may not be based on spoken language and the communications may be via any of multiple modalities, such as typed entry of text via a real or virtual keyboard, or similar substitutions, touchpad and mouse gestures, and combinations of the above. When communicating with players, the automated dealer may choose to convey this dialog output using text, speech synthesis, graphical representations of such forms or other user interface representations, or combinations of all three. The natural language processor may interface with a speech recognition system.

The automated dealer equipped with speech recognition and synthesis, natural language processing, dialog management, and game logic, has the capabilities to welcome the players to the table 102, provide instructions at any point in the conversational flow about the current game in play, about other games offered, and so forth. The automated dealer also maintains rules and play knowledge about a wide variety of casino games, and manages the games by dealing cards, accepting the selections of game playing options by players, and moving the players through a successful gaming experience. Additionally, this automated dealer generates banter with and among player to keep the experience entertaining, interacts with casino services, such as ordering drinks, calling for transportation, or alerting security, and can upsell additional services by announcing deals from a hotel, casino, or restaurant.

A machine-learning model can be a computer system that scientifically studies algorithms and/or statistics to perform a specific task effectively by relying on patterns and inference instead of using explicit instructions. A natural language processor can be a computer program that has the capability to understand human communication as it is typically spoken and written. A speech synthesizer can be a machine that generates spoken human language.

An automated dealer can be an entity that distributes the cards at the start of a game or hand, and which functions by itself with little or no direct human control. A player can be a person taking part in a game. A game of chance can be a form of play or sport, especially a competitive one played according to rules, and whose outcome is strongly influenced by some randomizing device.

After being trained, the trained machine-learning model optionally outputs information in different languages about playing different games of chance, block 304. The platform can inform, educate, and encourage people to play casino games. By way of example and without limitation, this may include the automated conversational multi-player gaming platform 100 continually refreshing digital monitors that list descriptions in many languages and display how-to-play-the-game videos of classic casino games and original casino games which were created for the platform 100.

The monitors encourage guests to "Go up to any of our 52 Production platforms, have a seat, and say, 'Hey, Shark.' Tell The Shark your language of choice and enjoy many gaming experiences. Let the Shark tell you about the games."

The monitors urge guests to play "Our original classic Shark Showdown, where you go around the board playing the game of 11 and try to be the first to fill a three-card winning poker hand. You will find it engaging, and the Shark will lead you on the way. After a few games of Shark Showdown, you may ask for the Shark to introduce you to the Shark's big brother, Texas Showdown, or some of our other original entertaining games. Oh, and 52 Productions' automated conversational multi-player gaming platform does offer some of the classics such as standard Blackjack and Texas Hold'em. 52 Production's mission is to become your one-stop automated conversational multi-player gaming pleasure!"

Information can be data as processed, stored, or transmitted by a computer. A natural language can be the principal method of human communication, consisting of words used in a structured and conventional way and conveyed by speech, writing, or gesture. Different games of chance can be various forms of play or sport, especially a competitive one played according to rules, and whose outcome is strongly influenced by some randomizing device. A requested game of chance can be a form of play or sport, especially a competitive one played according to rules, whose outcome is strongly influenced by some randomizing device, and which is provided by a computer in response to an instruction.

For example, after four casino guests approach the table 102 and say, "Hey, Shark, we speak English," the automated dealer replies, "Hi, I'm called 'The Shark.' Welcome to 52 Productions' myriad of gaming options. Here's the important thing to remember, you don't have to know how to play the games. The Shark is here to instruct you in the play of our many original gaming pleasures. Swipe your credit card or put your check in the slot that says, 'Ticket In, Ticket Out,' pick your game of choice and let the gaming thrills begin."

Having output any information about playing different games of chance, the trained machine-learning model receives requests from people to become players of a game of chance, block 306. The platform receives requests to play games of chance. In embodiments, this may include the automated dealer receiving requests from casino guests named Adam, Charles, J. P., and Asa to play Blackjack. Since the table 102 has five stations 104-112, four is the maximum number of Blackjack players who can play against the house, which plays using the fifth station that is not used by the four players.

The automated dealer can have a universal conversation, which means having a conversation with a generic player. However, when the automated dealer knows about an individual player, either through a membership card or various casino applications on the player's mobile device, the conversation with the player can vary and become specifically tailored to fit that individual player. For example, the automated dealer says "I see you are all holders of our membership card. Welcome back!"

Then the automated dealer continues, "Hey, Adam, you are about to reach $1,000 of winnings for the night. There is a special promotion at your hotel for a free upgrade to a suite if you do. So, let's go!"

The automated dealer is aware that Charles doesn't drink. Therefore, the automated dealer says, "Hey, Charles, should I call for a drink? Sprite as usual?"—

A request can be an instruction to a computer to provide information or perform another function. People can be humans. The requested game of chance may be poker, blackjack, baccarat, rummy, roulette, or craps. Poker can be a card game played by two or more people who bet on the value of the hands dealt to them.

Blackjack can be a gambling card game in which players try to acquire cards with a face value as close as possible to 21 without going over. Baccarat can be a gambling card game in which players hold two- or three-card hands, the winning hand being that giving the highest remainder when its face value is divided by ten. Rummy can be a card game, sometimes played with two decks, in which the players try to form sets and sequences of cards.

If the players select to play roulette or craps, then the built-in touch screens 114-122 will privately present only a player's available funds for betting, because the player will not have any cards to display privately, and the shared display screen 164 will present either a roulette wheel where the roulette ball rolls around, or the craps table where the dice are rolled. Roulette can be a gambling game in which a ball is dropped onto a revolving wheel with numbered compartments, the players betting on the number at which the ball will come to rest. Craps can be a gambling game played with two dice, chiefly in North America, in which a throw of 7 or 11 is a winning throw, and a throw of 2, 3, or 12 is a losing throw.

Having received requests from people to become players of a game of chance, the trained machine-learning model outputs private game content associated with the game of chance to the players' private user interfaces, block 308. The platform enables players to begin playing a casino game. For example, and without limitation, this may include the automated dealer dealing the players' face-down cards, which are visible only to the player who receives his card via one of the private control panels' display screens 114-122. An automated dealer can use a random number generator when dealing cards, because a successful random number generator distributes cards in an unpredictable and random way. A random number generator can be a creator of a sequence of symbols that cannot be reasonably predicted better than by chance.

The automated conversational multi-player gaming platform 100 is ADA (Americans with Disabilities Act)-friendly, speaking aloud for the blind, and communicating by text for the deaf. Consequently, outputting to one of the private user interfaces is exclusively outputting by speech synthesis via a natural language selected by a player, in response to an identification of a corresponding player as visually impaired, or exclusively outputting by text in response to an identification of a corresponding player as hearing impaired.

For example, the automated dealer says "Oh, Asa, your membership card identifies you as visually impaired. I know you can't see me. Well, I can't see you either. Ha, ha. Feel in front of you. In the center of each control panel is an earpiece."

After confirming that Asa is using the earpiece, the automated dealer continues, "Now that you have the earpiece in, and we are playing Blackjack, I am whispering to you to identify your face-down card as the Ten of Hearts. Like your favorite mobile device, I will talk to you as you make your moves on your touch control panel. We are an ADA-friendly gaming platform, and I will identify each player's face-up cards over your headphones and then suggest your possible moves."

Private game content can be information for a form of play or sport, especially a competitive one played according to rules and decided by skill, strength, or luck, and belonging to or for the use of one particular person. A private user interface can be the space where interactions between one particular person and a computer occur. Speech synthesis can be the process of generating spoken language by a machine.

An identification can be the association or linking of a person with a thing. Visually impaired can be a person who is partially to fully blind. Text can be data in the form of words or alphabetic characters. Hearing impaired can be a person who is partially to fully deaf.

In addition to outputting private information, the trained machine-learning model outputs public game content associated with the game of chance to the players' public user interface, block 310. The platform shares game information that all players can access. By way of example and without limitation, this may include the automated dealer dealing the players' face-up cards, which are displayed to all players on the shared display screen 164 in the Blackjack table 102.

Public game content can be information for a form of play or sport, especially a competitive one played according to rules and decided by skill, strength, or luck, and open to or shared by all the people in a group. A public user interface can be the space where interactions between a group of people and a computer occur. Private game content and the public game content may include playing cards associated with a deck of 52 playing cards. A deck can be a pack of cards. A playing card can be each of a set of rectangular pieces of material with different numbers and symbols on one side, and used for various games, some involving gambling.

After outputting private information and public information, the trained machine-learning model receives selections of game playing options and wager values associated with the game of chance from the players via their private user interfaces, block 312. The platform enables players to place bets on the game of chance that they are playing. In embodiments, this may include the automated dealer identifying that two players used their control panels' buttons to request another card by calling to be hit, joking that the two players who did not request to be hit must have great hands of cards, and determining that three players used their control buttons to place bets which are greater than the minimum required bet value. During each round of play, a wager (or multiple wagers) may be made by any player selecting an amount to wager. Although this example describes a player wagering money to play a game of chance, the player may subscribe to a service that provides the game of chance, or the player may play the game of chance free of any charge as a promotion.

An automated dealer must have a comprehensive and accurate knowledge of the games for which they deal, know the rules of the games of chance, understand the odds of winning in various situations, and they must be able to communicate this information correctly to all levels of players. For example, when J. P.'s face-up card is the Two of Clubs, and the houses' face-up card is the Ace of Diamonds, J. P. does not increase his minimum bet of $5. The automated dealer responds, "Good job, J. P. You are playing so much better than the last time you played. Of course, that was your first time playing, but still, very impressive!"

Then the automated dealer reassures him, "Just remember, that since the Shark is a conversational gaming experience, you don't have to know how to play the games. The Shark is here to protect you from dirty dealers, and I'll instruct you in the play of each game, and if you ask for help, I'm right here with an answer. When you are ready to play without any prompts, just tell The Shark to go chase Moby Dick."

A selection can be the act of a human operating a computer to choose something as being the most suitable. A game playing option can be a course of action that may be chosen to participate in a form of play or sport, especially a competitive one played according to rules and decided by skill, strength, or luck. A wager value can be the numerical amount that is risked on the occurrence of a future event. Although examples herein describe wager values based on money, a wager value may be based on credits, points, or any form of virtual currency.

Following the receipt of selections of game playing options and wager values, the trained machine-learning model outputs information identifying one player as a winner of the game of chance and a credit of the winner's wager value to the players' public user interface and/or the winner's private user interfaces, block 314. The platform identifies and pays any winners of the game. For example, and without limitation, this may include the automated dealer showing the face-down cards next to the face-up cards in the shared display screen 164 in the Blackjack table 102, and congratulating Adam as the only winner because his 21 points was the only point total that was more than the house's 20 points, and paying Adam $250 because he bet $250. A winner can be a person who is victorious in a game. A credit can be a payment.

Having credited the winner's wager value to the winner, the values of the wagers by other players of the game of chance are debited, in response to the identification of the one of the players as the winner of the game of chance, block 316. The platform collects the bets made by the players who lost the casino game. By way of example and without limitation, this may include the automated dealer determining that Asa's 20 points matched the house's total, so the automated dealer gave back the $100 that Asa bet, and keeping the $500 that Charles bet, and the $5 that J. P. bet, complementing J. P. on quickly learning when not to bet too much. A value can be a numerical amount. A wager can be an amount that is risked on the occurrence of a future event.

Although FIG. 3 depicts the blocks 302-316 occurring in a specific order, the blocks 302-316 may occur in another order. In other implementations, each of the blocks 302-316 may also be executed in combination with other blocks and/or some blocks may be divided into a different set of blocks.

FIG. 4 illustrates an example of conversational interactions 400 between a player and an automated conversational multi-player gaming platform, under an embodiment. The interactions 400 provide descriptions of games created for the platform 100, and additional examples of the automated dealer assuring a casino guest that the guest does not need to know all the rules of a game to enjoy playing the game because the interactive and conversational nature of the automated dealer enables the automated dealer to guide the guest through the play of the game.

Figure 5:
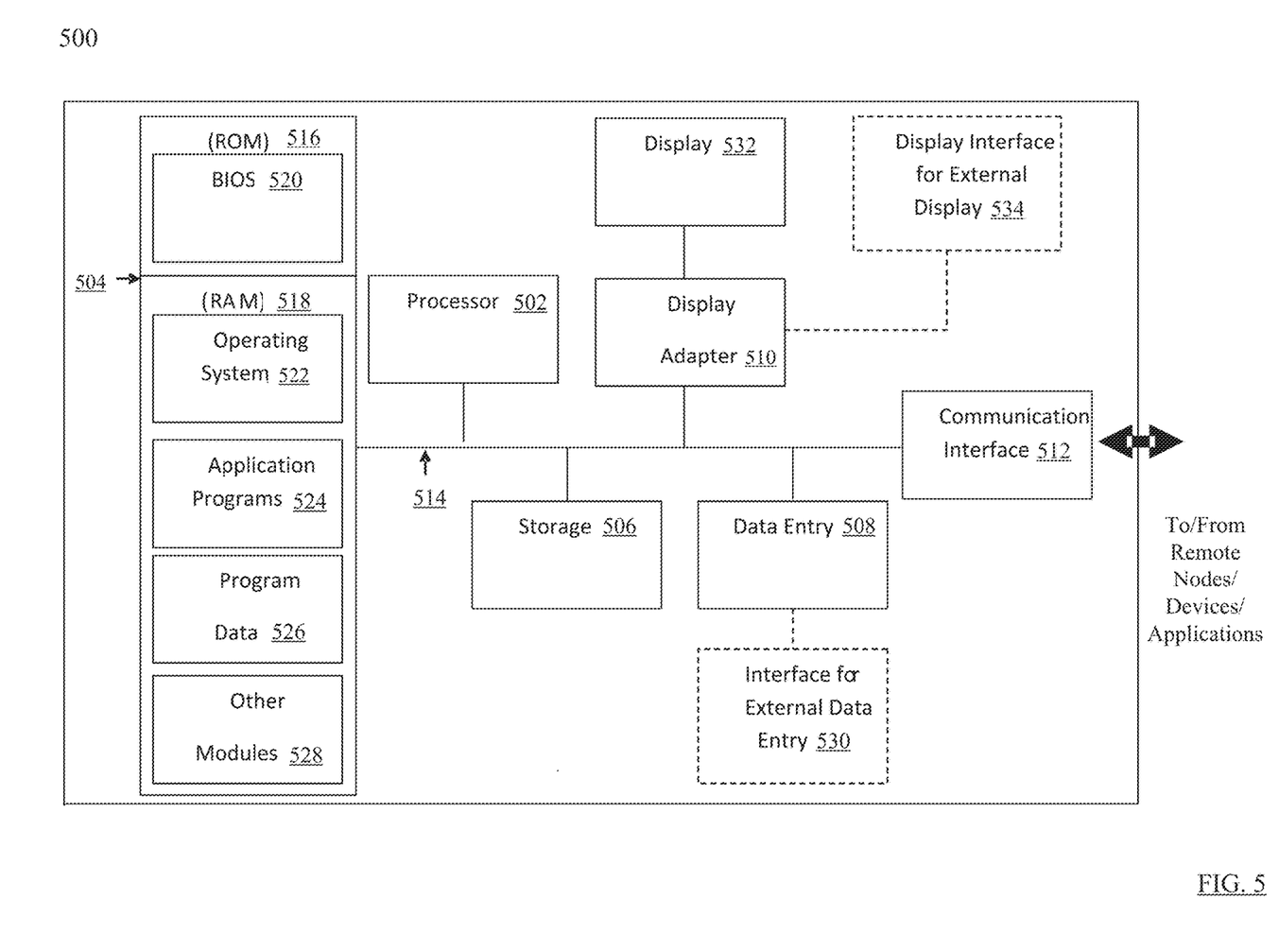
FIG. 5 is a block diagram illustrating an example hardware device in which the subject matter may be implemented.

An exemplary hardware device in which the subject matter may be implemented shall be described. Those of ordinary skill in the art will appreciate that the elements illustrated in FIG. 5 may vary depending on the system implementation. With reference to FIG. 5, an exemplary system for implementing the subject matter disclosed herein includes a hardware device 500, including a processing unit 502, a memory 504, a storage 506, a data entry module 508, a display adapter 510, a communication interface 512, and a bus 514 that couples elements 504-512 to the processing unit 502.

The bus 514 may comprise any type of bus architecture. Examples include a memory bus, a peripheral bus, a local bus, etc. The processing unit 502 is an instruction execution machine, apparatus, or device and may comprise a microprocessor, a digital signal processor, a graphics processing unit, an application specific integrated circuit (ASIC), a field programmable gate array (FPGA), etc. The processing unit 502 may be configured to execute program instructions stored in the memory 504 and/or the storage 506 and/or received via the data entry module 508.

The memory 504 may include a read only memory (ROM) 516 and a random-access memory (RAM) 518. The memory 504 may be configured to store program instructions and data during operation of the hardware device 500. In various embodiments, the memory 504 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example.

The memory 504 may also include nonvolatile memory technologies such as nonvolatile flash RAM (NVRAM) or ROM. In some embodiments, it is contemplated that the memory 504 may include a combination of technologies such as the foregoing, as well as other technologies not specifically mentioned. When the subject matter is implemented in a computer system, a basic input/output system (BIOS) 520, containing the basic routines that help to transfer information between elements within the computer system, such as during start-up, is stored in the ROM 516.

The storage 506 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 500.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which may store data that is accessible by a computer, such as magnetic cassettes, flash memory cards, digital video disks, Bernoulli cartridges, RAM, ROM, and the like may also be used in the exemplary operating environment. As used here, a "computer-readable medium" may include one or more of any suitable media for storing the executable instructions of a computer program in one or more of an electronic, magnetic, optical, and electromagnetic format, such that the instruction execution machine, system, apparatus, or device may read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high-definition DVD (HD-DVD™), a BLU-RAY disc; and the like.

A number of program modules may be stored on the storage 506, the ROM 516 or the RAM 518, including an operating system 522, one or more applications programs 524, program data 526, and other program modules 528. A user may enter commands and information into the hardware device 500 through data entry module 508. The data entry module 508 may include mechanisms such as a keyboard, a touch screen, a pointing device, etc.

Other external input devices (not shown) are connected to the hardware device 500 via an external data entry interface 530. By way of example and not limitation, external input devices may include a microphone, joystick, game pad, satellite dish, scanner, or the like. In some embodiments, external input devices may include video or audio input devices such as a video camera, a still camera, etc. The data entry module 508 may be configured to receive input from one or more users of the hardware device 500 and to deliver such input to the processing unit 502 and/or the memory 504 via the bus 514.

A display 532 is also connected to the bus 514 via the display adapter 510. The display 532 may be configured to display output of the hardware device 500 to one or more users. In some embodiments, a given device such as a touch screen, for example, may function as both the data entry module 508 and the display 532. External display devices may also be connected to the bus 514 via the external display interface 534. Other peripheral output devices, not shown, such as speakers and printers, may be connected to the hardware device 500.

The hardware device 500 may operate in a networked environment using logical connections to one or more remote nodes (not shown) via the communication interface 512. The remote node may be another computer, a server, a router, a peer device or other common network node, and typically includes many or all of the elements described above relative to the hardware device 500. The communication interface 512 may interface with a wireless network and/or a wired network.

Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 512 may include logic configured to support direct memory access (DMA) transfers between the memory 504 and other devices.

In a networked environment, program modules depicted relative to the hardware device 500, or portions thereof, may be stored in a remote storage device, such as, for example, on a server. It will be appreciated that other hardware and/or software to establish a communications link between the hardware device 500 and other devices may be used.

It should be understood that the arrangement of the hardware device 500 illustrated in FIG. 5 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 500.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the descriptions above, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in a context, it is not meant to be limiting as those of skill in the art will appreciate that various of the acts and operations described hereinafter may also be implemented in hardware.

To facilitate an understanding of the subject matter described above, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for an automated conversational multi-player gaming platform, the system comprising:
one or more processors; and
a non-transitory computer readable medium storing a plurality of instructions, which when executed, cause the one or more processors to:
train a machine-learning model to use a natural language processor and a speech synthesizer as an automated dealer communicating with players of at least one game of chance;
output, by the trained machine-learning model, private game content associated with the game of chance to private user interfaces for players of a game of chance, in response to receiving requests from people to become the players of the game of chance;
output, by the trained machine-learning model, public game content associated with the game of chance to a public user interface for the players; and
output, by the trained machine-learning model, information identifying one of the players as a winner of the game of chance and a credit of a wager value by the winner to at least one of one of the private user interfaces for the winner or the public user interface, in response to receiving selections of game playing options and wagers values associated with the game of chance by the players via the private user interfaces,
wherein outputting to one of the private user interfaces is exclusively output by speech synthesis via a natural language selected by a player, in response to an identification of a corresponding player as visually impaired, or exclusively output by text in response to an identification of a corresponding player as hearing impaired.

2. The system of claim 1, wherein the plurality of instructions, when executed, will further cause the one or more processors to output, by the trained machine-learning model, information in natural languages about playing different games of chance, including the requested game of chance.

3. The system of claim 1, wherein the requested game of chance comprises one of poker, blackjack, baccarat, rummy, roulette, craps, Shark Showdown, Texas Showdown, or Batty.

4. The system of claim 1, wherein the private game content and the public game content comprise playing cards associated with a deck of 52 playing cards.

5. The system of claim 4, wherein the automated dealer uses a random number generator to deal the playing cards to the players.

6. The system of claim 1, wherein the plurality of instructions, when executed, will further cause the one or more processors to debit the values of the wagers by the other players of the game of chance, in response to the identification of the one of the players as the winner of the game of chance.

7. A computer-implemented method for a computer game of chance, the method comprising:
training a machine-learning model to use a natural language processor and a speech synthesizer as an automated dealer communicating with players of at least one game of chance;
outputting, by the trained machine-learning model, private game content associated with the game of chance to private user interfaces for players of a game of chance, in response to receiving requests from people to become the players of the game of chance;
outputting, by the trained machine-learning model, public game content associated with the game of chance to a public user interface for the players; and
outputting, by the trained machine-learning model, information identifying one of the players as a winner of the game of chance and a credit of a wager value by the winner to at least one of one of the private user interfaces for the winner or the public user interface, in response to receiving selections of game playing options and wagers values associated with the game of chance by the players via the private user interfaces, wherein outputting to one of the private user interfaces is exclusively output by speech synthesis via a natural language selected by a player, in response to an identification of a corresponding player as visually impaired, or exclusively output by text in response to an identification of a corresponding player as hearing impaired.

8. The computer-implemented method of claim 7, wherein the method further comprises outputting, by the trained machine-learning model, information in natural languages about playing different games of chance, including the requested game of chance.

9. The computer-implemented method of claim 7, wherein the requested game of chance comprises one of poker, blackjack, baccarat, rummy, roulette, craps, Shark Showdown, Texas Showdown, or Batty.

10. The computer-implemented method of claim 7, wherein the private game content and the public game content comprise playing cards associated with a deck of 52 playing cards.

11. The computer-implemented method of claim 10, wherein the automated dealer uses a random number generator to deal the playing cards to the players.

12. The computer-implemented method of claim 7, wherein the method further comprises debiting the values of the wagers by the other players of the game of chance, in response to the identification of the one of the players as the winner of the game of chance.

13. A computer program product, comprising a non-transitory computer-readable medium having a computer-readable program code embodied therein to be executed by one or more processors, the program code including instructions to:

train a machine-learning model to use a natural language processor and a speech synthesizer as an automated dealer communicating with players of at least one game of chance;

output, by the trained machine-learning model, private game content associated with the game of chance to private user interfaces for players of a game of chance, in response to receiving requests from people to become the players of the game of chance;

output, by the trained machine-learning model, public game content associated with the game of chance to a public user interface for the players; and output, by the trained machine-learning model, information identifying one of the players as a winner of the game of chance and a credit of a wager value by the winner to at least one of one of the private user interfaces for the winner or the public user interface, in response to receiving selections of game playing options and wagers values associated with the game of chance by the players via the private user interfaces, wherein outputting to one of the private user interfaces is exclusively output by speech synthesis via a natural language selected by a player, in response to an identification of a corresponding player as visually impaired, or exclusively output by text in response to an identification of a corresponding player as hearing impaired.

14. The computer program product of claim 13, wherein the program code includes further instructions to output, by the trained machine-learning model, information in natural languages about playing different games of chance, including the requested game of chance.

15. The computer program product of claim 13, wherein the requested game of chance comprises one of poker, blackjack, baccarat, rummy, roulette, craps, Shark Showdown, Texas Showdown, or Batty.

16. The computer program product of claim 13, wherein the private game content and the public game content comprise playing cards associated with a deck of 52 playing cards, and the automated dealer uses a random number generator to deal the playing cards to the players.

17. The computer program product of claim 13, wherein the program code includes further instructions to debit the values of the wagers by the other players of the game of chance, in response to the identification of the one of the players as the winner of the game of chance.

* * * * *